July 1, 1930.  C. C. ADELSPERGER ET AL  1,769,731
THEATER CHAIR
Filed April 9, 1927   5 Sheets-Sheet 1

INVENTORS
Charles C. Adelsperger
and Heber D. Fitzgerald,
BY
Hood + Hahn
ATTORNEYS

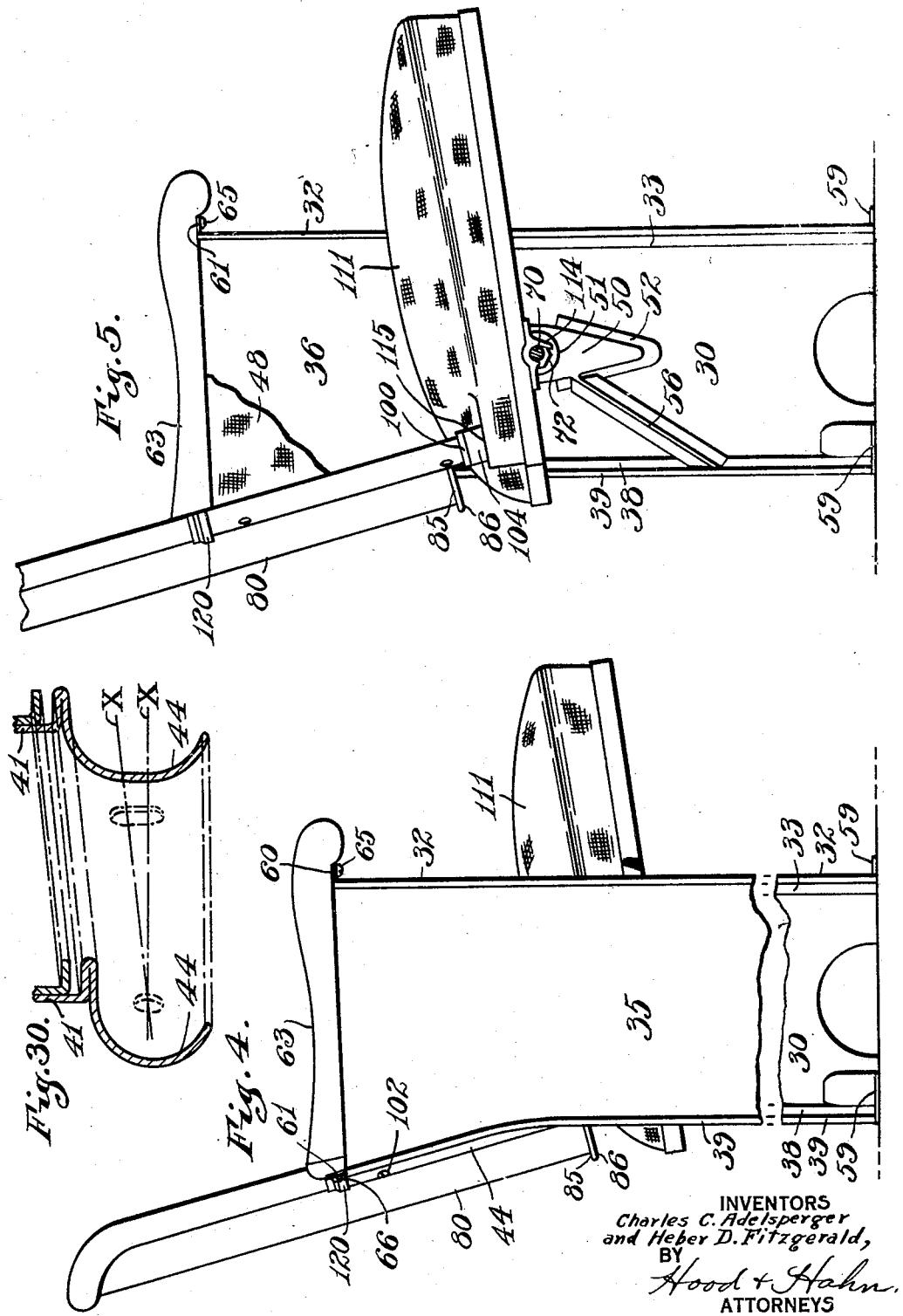

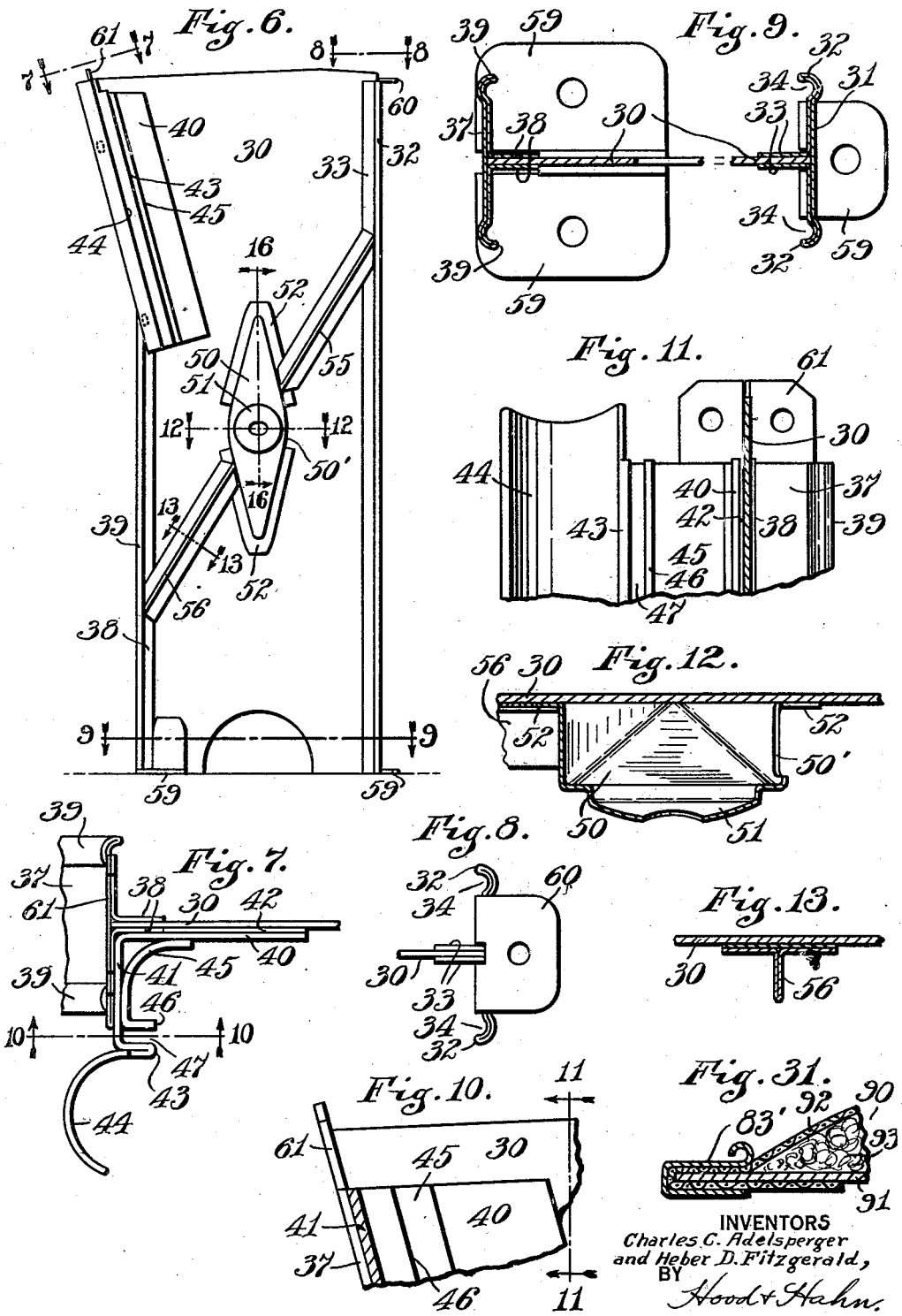

July 1, 1930.  C. C. ADELSPERGER ET AL  1,769,731
THEATER CHAIR
Filed April 9, 1927    5 Sheets-Sheet 4
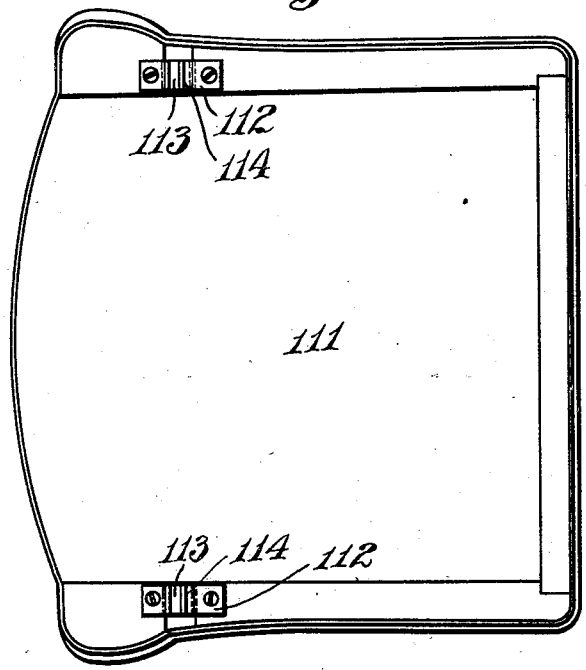
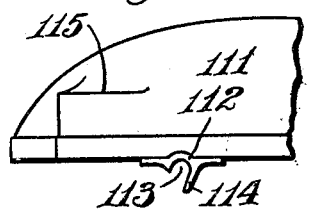
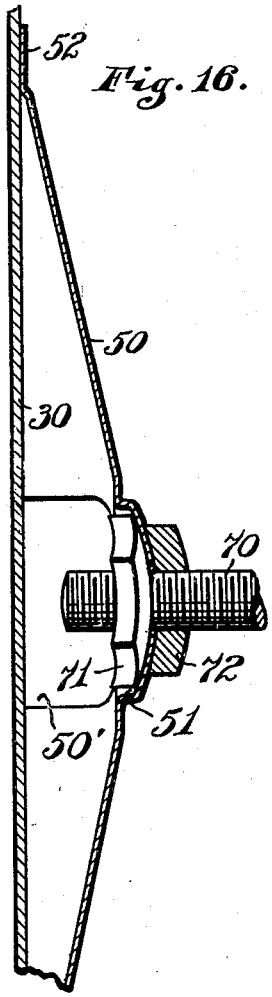
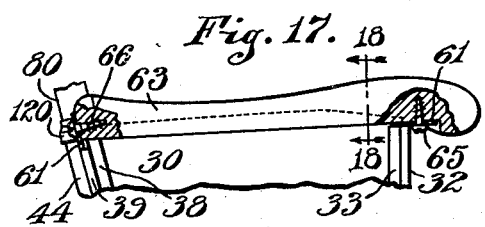
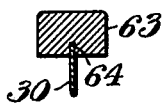
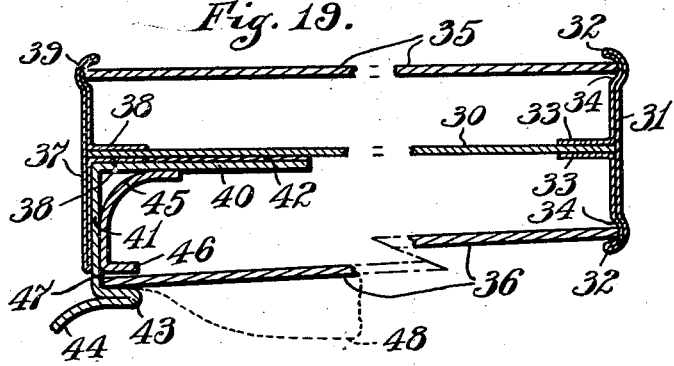
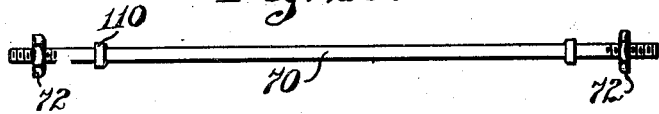
INVENTORS
Charles C. Adelsperger
and Heber D. Fitzgerald,
BY
Hood + Hahn
ATTORNEYS

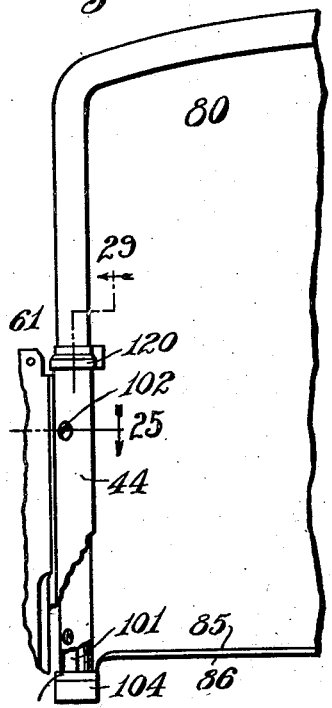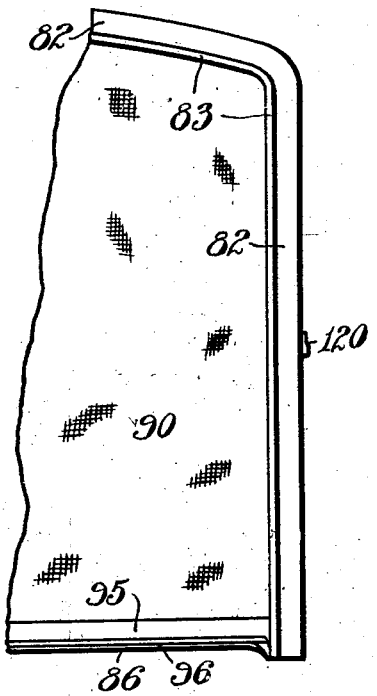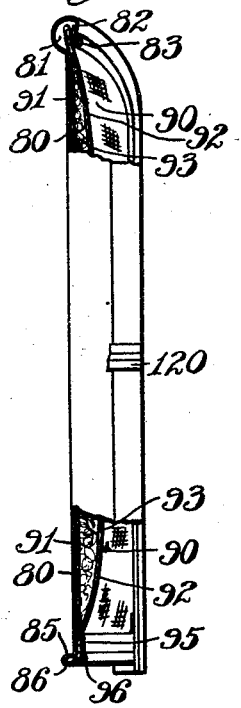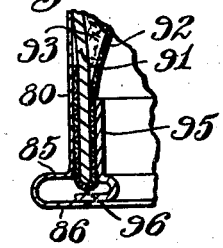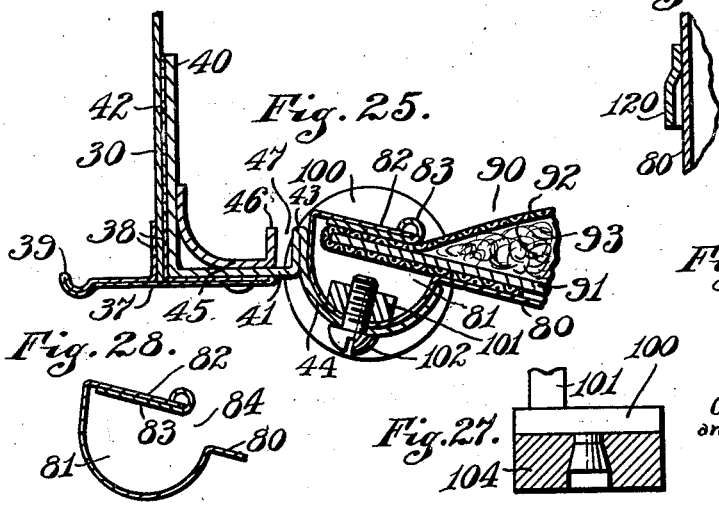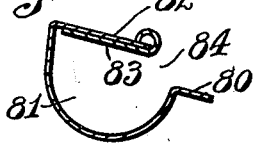

Patented July 1, 1930

1,769,731

UNITED STATES PATENT OFFICE

CHARLES C. ADELSPERGER AND HEBER D. FITZGERALD, OF UNION CITY, INDIANA, ASSIGNORS TO UNION CITY BODY COMPANY, OF UNION CITY, INDIANA, A CORPORATION OF INDIANA

THEATER CHAIR

Application filed April 9, 1927. Serial No. 182,215.

The object of our invention is to produce a theater chair of such form that it may be readily shipped knocked down; easily assembled without special tools, and associated with similar chairs in rows of any desired number of chairs and in any desired chair-row curvature.

The accompanying drawings illustrate our invention.

Figure 1:
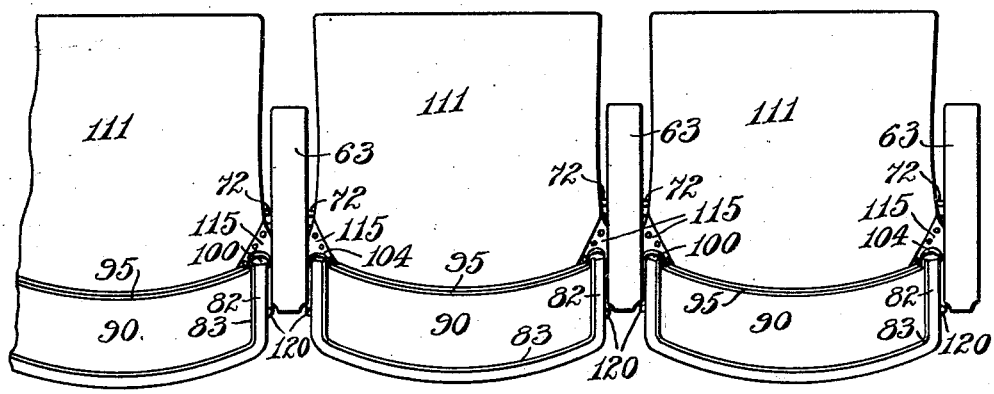

Fig. 1, is a plan of several of our improved chairs arranged in a straight row.

Figure 2:
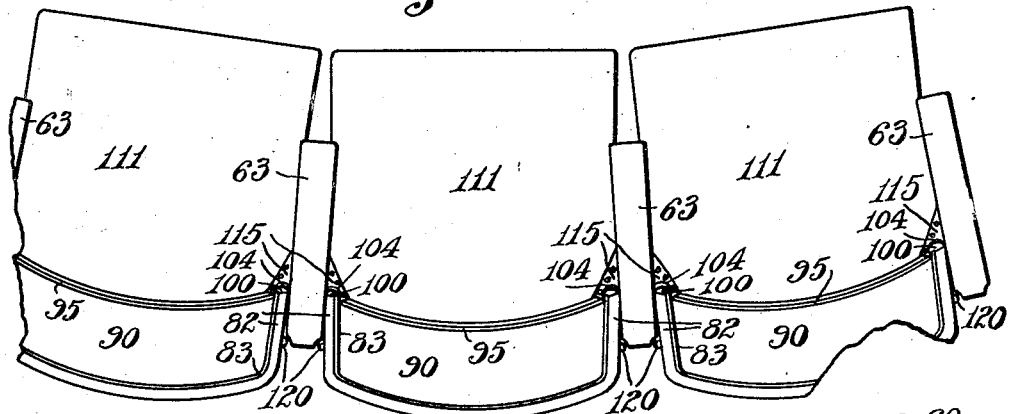

Fig. 2, a similar view showing different angular relations.

Figure 3:
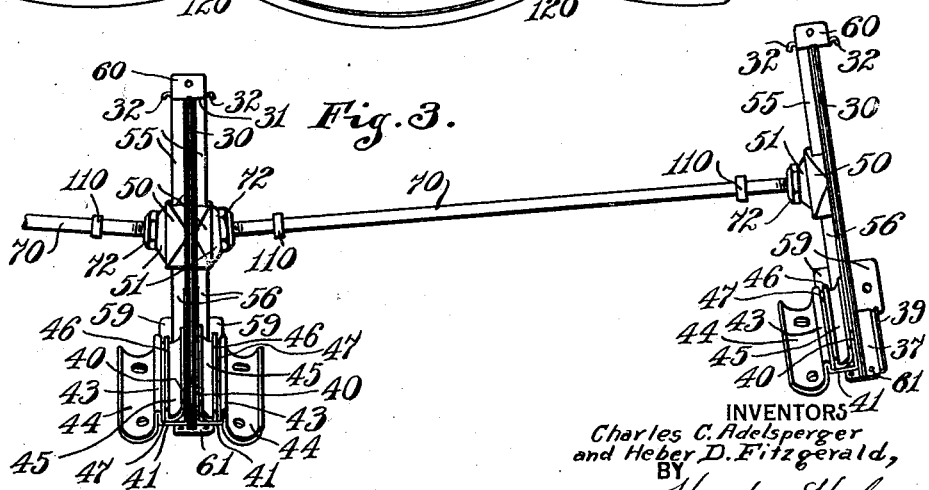

Fig. 3, a plan of two end sections and the connecting rods, the seat, back and finishing plates having been omitted.

Fig. 4, a side elevation.

Fig. 5, a vertical section just inside one side element.

Fig. 6, an inner face view of one of the side elements.

Fig. 7, a fragmentary plan on line 7—7 of Fig. 6.

Fig. 8, a fragmentary plan on line 8—8 of Fig. 6.

Fig. 9, a section on line 9—9 of Fig. 6.

Fig. 10, a section on line 10—10 of Fig. 7.

Fig. 11, a section on line 11—11 of Fig. 10.

Fig. 12, a section on line 12—12 of Fig. 6.

Fig. 13, a section on line 13—13 of Fig. 6.

Fig. 14, an under plan, on the scale of Figs. 4 and 5, of the pivoted seat.

Fig. 15, a fragmentary elevation of the rear end of the seat.

Fig. 16, a section, on an enlarged scale, on line 16—16 of Fig. 6 with the connecting rod in place.

Fig. 17, an elevation in partial vertical section of the arm rest and associated parts.

Fig. 18, a section on line 18—18 of Fig. 17.

Fig. 19, a fragmentary horizontal section of one of the side elements just beneath the arm rest.

Fig. 20, an elevation of one of the stretcher rods.

Fig. 21 a front elevation, in partial vertical section, of one of the chair backs and adjacent parts.

Fig. 21$^a$, a rear elevation of the chair back.

Fig. 22, a side elevation and partial vertical section of the back.

Fig. 23, an under plan of the back.

Fig. 24, an enlarged vertical sectional detail of the lower part of the back.

Fig. 25 an enlarged horizontal fragmentary section on line 25 of Fig. 21$^a$.

Fig. 26, a perspective of a back and side coupling member which also serves as a set stop.

Fig. 27, a fragmentary vertical sectional detail of the lower end of the coupling member shown in Fig. 26; Fig. 28, a fragmentary detail of the vertical edge of the back; Fig. 29 a fragmentary section on line 29 of Fig. 21$^a$; Fig. 30 comparative horizontal sections taken through the upper and lower portions of the back-receiving pocket, and Fig. 31 a fragmentary detail of a slight modification of the parts shown in Fig. 25.

In the drawings 30 indicates a comparatively thin sheet of metal of sufficient height and width for a side element or standard of the chair. Along the vertical front edge of this plate we secure a front flange structure 31 illustrated in detail in Figs. 9 and 19, said structure being conveniently formed of a single sheet of thin metal doubled upon itself at 32, 32 and with its edges 33, 33 arranged at right angles to the medial portion of the sheet, parallel with each other and spaced from each other at a distance equal to the thickness of plate 30, said edges 33, 33 being secured to plate 30 by any suitable means, most conveniently by spot welding.

Immediately adjacent each fold line 32, 32 we form a groove 34 both for appearance and also for the reception either of an end finish plate 35, which will be the full height of the end element, as shown in Fig. 4, at the end of a row or in a single chair, or of an inner finish plate 36, as shown in Fig. 5, said plate extending only over that portion of the side element above the seat plan.

Associated with the rear vertical edge of plate 30 is a rear flange structure 37 similar to the structure 31 its edges 38, 38 embracing and being secured to the rear edge of plate 30. For a single chair or the end chair of a row the flange structure 37 will be provided, as indicated in Fig. 19, with an appropriate groove (or grooves) 39, similar to grooves 34 and arranged in opposition thereto.

Secure to plate 30 along its rear vertical edge at the top, where said edge is inclined upwardly and rearwardly, as shown in Fig. 6, is a strip of metal bent to form two arms 40 and 41 at right angles to each other so that arm 40 may lie parallel with plate 30 and arm 41 parallel with the main body of structure 37, said arms 40 and 41 being secured to the adjacent parts by spot welding or otherwise, and a filler strip 42 being introduced, as shown in Fig. 19, to compensate for the thickness of the adjacent edge 38. The strip embodying arms 40 and 41 is also bent and doubled upon itself at an intermediate point to form a lip or rib 43 and a semi-cylindrical back receiving pocket 44 this lip or rib provides a yielding connection between the pocket 44 and the chair end whereby after the chair has been assembled and when the chairs are set up in rows, a certain amount of give is provided at this point to allow for proper adjustment. A bracing strip 45 is arranged on the corner between arms 40 and 41 and secured thereto, said bracing strip being bent at one edge to form a lip 46 arranged parallel with and spaced from rib 43 so as to form a groove 47 for the reception of one edge of finish plate 36. This plate 36 may be plain, or may carry suitable upholstering indicated in dotted lines at 48 in Fig. 19.

Secured to each inner face of plate 30 is a stretcher rod pocket 50 (Figs. 3, 6, 12 and 16) bent at its middle to form a semi-spherical nut socket 51 and its edges 52 formed into flanges by means of which the pocket may be readily secured to the face of plate 30 by spot welding or otherwise.

Also secured to each inner face of plate 30 are brace ribs 55, 56, rib 55 serving as a stop and support for finish plate 36.

The end elements are provided, at their lower ends, with outturned foot flanges 59 (Fig. 6) by means of which the chairs may be firmly secured to the floor. The upper end of element 31 is outturned at 60, just below the upper edge of plate 30, and the upper end of element 37 is extended up, as indicated at 61 (Fig. 6).

An arm rest 63 (Figs. 17 and 18), is most conveniently formed of wood, its lower face being gained, at 64, to receive the upper edge of plate 30 and held in place by fastening screws 65 and 66 passed through lips 60 and 61 respectively and the arm 63 overlying the upper edges of the finish plates 35—36.

The end elements are held in proper spaced relationship, both as to distance and angular relations by a stretcher rod 70 threaded at each end to receive a pair of nuts 71 and 72, the nut 71 having a semi-spherical end and being insertable into pocket 50 through opening 50' (Fig. 12). The nut 72 is formed on one face with a semi-spherical concavity, the two nuts cooperating to clamp the semi-spherical wall of nut socket 51, the arrangement being such that there is a sufficient degree of flexibility of association of the stretcher rods and its nuts with the nut pockets to permit an adjustment of the angular relationship of adjacent end elements both horizontally and vertically whereby desired curvature of chair rows may be obtained and variations in floor level provided for.

The chair back is formed of a comparatively thin metal sheet 80 (Figs. 21–28), the two vertical edges and top of which are rolled, as indicated in detail in Fig. 28, to form a receiving pocket 81 and a finished edge 82, which may be most conveniently formed by an added finishing strip 83, access to the pocket 81 being had through the space 84.

The lower edge of plate 80 is first turned rearwardly at 85 and then forwardly at 86 to form a lip or footing for the lower edge of a removable upholstery back 90. Back 90 comprises a base plate 91 which is properly dimensioned and shaped so that its sides and upper edge may be projected into the pockets 81. The finishing fabric 92 is stretched over this plate 90 and the padding 93 and held in place by friction with the back plate and pocket-forming portions thereof and the upholstering is retained in place by a metal strip 95 which is forced into place at the lower edge of the back and is provided with an outturned foot flange 96 resting upon flange 86, the ends of the strip 95 projecting into the lower ends of the vertical pockets 81 as indicated in Fig. 23.

The pockets 81 of the chair back are so formed as to fit in the pockets 44 of the side elements and are held in place by coupling elements as shown in Figs. 26 and 27. Each of these coupling elements comprises a head 100 which covers the lower ends of the associated pockets 44 and 81, and a shank 101 projectable into pocket 81, the parts being firmly clamped together by screws 102 passing through suitable perforations in pockets 44 and 81 and into threaded holes 103 in shank 101. The lower end of head 100 preferably provided with a rubber or resilient portion 104 the purpose of which will appear.

Each stretcher rod 70 is provided, at a point suitably spaced from the normal position of nut 72, with a collar 110. The seat 111, of any desired construction and suitable upholstery, is provided on its under face, with trunnion brackets 112 each of which is provided with a pocket 113 adapted to receive and pivot upon a stretcher bar 70 between its collar 110 and 72 and said pocket 113 is preferably flanked by a tongue 114 which, if desired, after the seat has been placed in position, may be bent over under the stretcher rod so as to prevent withdrawal of the seat without interfering with its pivotal action.

The seat frame is provided at each rear corner, on its top side, with a platform 115 which will come into engagement with the rubber portions 104 of the coupling elements 100 when the seat is in occupant receiving position.

Opposite the upper end of each part 44 each pocket 81 is provided with an external downturned flange 120, spaced from plate 80, (Fig. 29) so as to receive the upper end of pocket 44 when the parts are assembled.

The construction which we have described may be made of very light material and at very low cost and the parts may be readily assembled without the use of special tools but the result is an attractive and serviceable theater chair which adapts itself readily to varying conditions.

A change of angular relationship of the two end sections, requires, because of the inclination of the back, a slight difference in proportion of the upper and lower parts of the back-receiving pocket 44. As indicated in Fig. 30, the portion 41 is conveniently made about ¼ of an inch narrower at the bottom than at the top and the pocket 44 is widened at its lower end, the middle portion thereof having a somewhat flatter curvature, as indicated between the lines X X, than the flanking curvatures which are substantially the same as the general curvature of the upper portion of the pocket.

The strip 83 (Fig. 25) is frictionally held in place between the fabric 92 and the lip 82. In some instances it is convenient to use the substitute construction shown in Fig. 31, strip 83' be doubled upon itself so that the trough-like member or chip may be slipped over the doubled edge of the fabric 92 and the enclosed edge of the base plate 91, thus holding the upholstery in place preliminary to slipping the upholstery back into position on the back plate.

We claim as our invention:

1. A theater chair comprising two side structures each having a back-receiving portion and each having on its inner face a stretcher rod pocket, a stretcher rod extending from the pocket of one side to the pocket of the other side and having a limited freedom of angular movement relative to said pockets, and clamping means for firmly engaging the rod and pocket in any of their relations.

2. A theater chair comprising two side structures each having a back-receiving portion and each having on its inner face a stretcher rod pocket, a stretcher rod extending from the pocket of one side to the pocket of the other side and having a limited freedom of angular movement relative to said pockets, and clamping means engaging the rod and pocket, and a seat pivotally supported upon said stretcher rod.

3. A theater chair comprising two metal end members, each having at its upper rear corners a back receiving pocket yieldably connected to the end member, a back provided at each side with a portion adapted to fit one of said pockets and means for engaging said mating parts for clamping said back in said pockets.

4. A theater chair comprising two end members each provided along the upper portion of its rear edge with a sheet metal semi-tubular pocket, a back having a tubular portion at each side adapted to fit a semi-tubular portion of a side member, a coupling member telescopically associated with said parts, and means for clamping said coupling member, end member pocket and back together.

5. A theater chair comprising two end members each provided along the upper portion of its rear edge with a sheet metal semi-tubular pocket, a back having a tubular portion at each side adapted to fit a semi-tubular portion of a side member, a coupling member telescopically associated with said parts, and means for clamping said coupling member, end member pocket and back together, said coupling member having an exposed lower end, a stretcher bar extending between and clamped to the end members, and a seat pivotally mounted on said stretcher bar and having portions at its rear corners adapted to engage said coupling members to limit the downward movement of the seat.

6. An end member for theater chairs comprising a central sheet metal web, laterally extending stiffening sheet metal portions secured to the vertical edges of said web and formed into finish-plate receiving-grooves, and finish plates mounted in said grooves.

7. An end member for theater chairs comprising a central sheet metal web, laterally extending stiffening sheet metal portions secured to the vertical edges of said web and formed into a finish-plate receiving-grooves, a finish plate mounted in said grooves, an arm rest overlying said plate, and means for securing said arm rest in place.

8. An end member for theater chairs comprising a central sheet metal web, laterally extending stiffening sheet metal portions secured to the vertical edges of said web and formed into a finish-plate receiving-groove, a finish plate mounted in said groove, an arm rest overlying said plates and having a gain in its under face to receive the upper projecting edge of the central web, and means for securing said arm rest in place.

9. A theater chair comprising two sheet metal end portions each provided along the upper portion of its rear edge with a back receiving pocket, a back provided along the lower part of each side with a tubular portion adapted to fit an adjacent pocket of the side element and provided with a depending flange arranged to fit over the upper edge of a back receiving pocket, a coupling member arranged within each tubular portion of the back, and clamping elements passing through the back receiving pockets and cooperating with said coupling member.

10. A theater chair comprising two sheet metal end portions each provided along the upper portions of its rear edge with a back receiving pocket, a back provided along the lower part of each side with a tubular portion adapted to fit an adjacent pocket of the side element and provided with a depending flange arranged to fit over the upper edge of a back receiving pocket, a coupling member having a head adapted to engage the lower end of a back receiving pocket and a shank projectable into a tubular portion of the back, clamping means projected through the back receiving pocket and engaging the shank of the coupling member, a stretcher rod extending between and connecting the end plates, and a seat pivotally supported on said stretcher rod, said seat having portions near its rear corners adapted to engage the headed ends of the coupling members.

11. A theater chair comprising two sheet metal end portions each provided along the upper portion of its rear edge with a back receiving pocket, a back provided along the lower part of each side with a tubular portion adapted to fit an adjacent pocket of the side element and provided with a depending flange arranged to fit over the upper edge of a back receiving pocket, a coupling member having a head adapted to engage the lower end of a back receiving pocket and a shank projectable into a tubular portion of the back, clamping means projected through the back receiving pocket and engaging the shank of the coupling member.

12. A theater chair comprising two end members each having at its rear a back-receiving portion, a back having at each side a portion flexibly cooperative with the one of said back-receiving portions, and other means for coupling the two end members together.

13. A theater chair comprising two end members each having at its rear a back-receiving portion, a back having at each side a portion flexibly cooperative with one of said back-receiving portions, a stretcher-rod pocket carried by the inner face of each end member, a stretcher rod with clamping means connecting said pockets.

14. A theater chair comprising two end members each having at its rear a back-receiving portion, a back having at each side a portion flexibly cooperative with one of said back-receiving portions, a stretcher-rod pocket carried by the inner face of each end member, a stretcher rod with clamping means connecting said pockets, and a seat supported on said stretcher rod.

15. A theater chair comprising two end members each having at its rear a back-receiving portion, a back having at each side a portion flexibly cooperative with the one of said back-receiving portions, a stretcher-rod pocket carried by the inner face of each member, a stretcher rod, and clamping means carried by said rod and cooperative with the pockets permitting lateral flexibility between the end members and stretcher rod during assembly.

16. A theater chair comprising two end members, a connecting inclined back and a stretcher rod; each end member having an inclined sheet-metal back-receiving semi-conical pocket, and the back of which is provided at each lower corner with a portion adapted to cooperatively lie in one of said pockets in such manner as to permit angular adjustment of the side members relative to the back; and clamping means by which the back and end members may be firmly clamped together.

17. A theater chair comprising two end members, a connecting inclined back and a stretcher rod; each end member having an inclined sheet-metal back-receiving semi-conical pocket, and the back of which is provided at each lower corner with a portion adapted to cooperatively lie in one of said pockets in such manner as to permit angular adjustment of the side members relative to the back; and clamping means by which the back and end members may be firmly clamped together, a stretcher rod extending between the end members, and means by which said rod and end members may be clamped together, said means permitting angular adjustment of the end members relative to the back during floor assembly.

18. A theater chair, comprising two side structures, each having a back receiving portion and each having on its inner face a stretcher rod pocket, a stretcher rod extending from the pocket of one side to the pocket of the other side and having a limited freedom of angular movement relative to said pockets and a freedom of axial movement relative to said pockets, and clamping means for firmly engaging the rod and pocket in any of their relations.

19. A theater chair, comprising two side structures, each having a back receiving portion and each having on its inner face a stretcher rod pocket, a stretcher rod extending from the pocket of one side to the pocket of the other side and having a limited freedom of angular movement relative to said pocket and clamping means adjustable on said rod for firmly engaging the rod and pockets in any of their relations.

20. A theater chair comprising two side structures, each having a back receiving portion and each having on its inner face a stretcher rod pocket, a stretcher rod extending from the pocket of one side to the pocket of the other side and having a limited freedom of angular movement relative to said pockets and having an axial movement relative to said pockets, clamping means for firmly engaging the rod and pocket in any of their relations and a seat pivotedly supported upon said stretcher rod.

21. A theater chair comprising two side structures, each having a back receiving portion and each having on its inner face a stretcher rod pocket, a stretcher rod extending from the pocket of one side to the pocket of the other side and having a limited freedom of angular movement relative to pocket and clamping means adjustable on said rod for firmly engaging the rod and the pocket in any of their relations and a seat pivotedly supported on said stretcher rod.

22. A theater chair comprising two side structures, each having a back receiving portion and each having on its inner face a substantially semi-spherical stretcher rod pocket having an opening therein, a stretcher rod extending from the pocket of one side to the pocket of the other side and projecting into said pocket through said opening, said opening being sufficiently large to permit of a limited freedom of angular movement relative to the rod and pockets, an abutment adjustable on said rod and a clamping nut on said rod for engaging the wall of said pocket between the same to firmly clamp said wall in any of its adjusted positions.

23. A theater chair comprising two side structures, each having a back receiving portion and each having on its inner face semi-spherical stretcher rod pockets provided with openings, a stretcher rod extending from the pocket of one side to the pocket of another and having a limited freedom of angular movement relative to said pockets and clamping nuts threaded on said rod and arranged to grip the walls of said pocket therebetween for holding said rod and pocket in any of their relations.

In witness whereof, CHARLES C. ADELSPERGER and HEBER D. FITZGERALD have hereunto set their hands at Union City, Indiana, this 26th day of March, A. D. one thousand nine hundred and twenty-seven.

CHARLES C. ADELSPERGER.
HEBER D. FITZGERALD.